(12) United States Patent
Hikita

(10) Patent No.: US 7,278,605 B2
(45) Date of Patent: Oct. 9, 2007

(54) GUIDE ROLLER IN TAPE DRIVE AND METHOD OF CONTROLLING THE SAME

(75) Inventor: Minoru Hikita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 318 days.

(21) Appl. No.: 10/999,075

(22) Filed: Nov. 30, 2004

(65) Prior Publication Data

US 2006/0043235 A1    Mar. 2, 2006

(30) Foreign Application Priority Data

Sep. 2, 2004    (JP) .............................. 2004-255750

(51) Int. Cl.
*B65H 23/04* (2006.01)
(52) U.S. Cl. ................. 242/615.2; 360/130.21
(58) Field of Classification Search ............ 242/615.1, 242/615.2, 615.3; 226/190; 360/130.21
See application file for complete search history.

(56) References Cited

U.S. PATENT DOCUMENTS 6,738,224 B2 *   5/2004   Oohara ................. 360/130.21

FOREIGN PATENT DOCUMENTS

| JP | 06-124503 | 5/1994 |
|---|---|---|
| JP | 06-162626 | 6/1994 |
| JP | 08-147824 | 6/1996 |
| JP | 09-017067 | 1/1997 |

\* cited by examiner

*Primary Examiner*—John Q. Nguyen
(74) *Attorney, Agent, or Firm*—Staas & Halsey LLP

(57) ABSTRACT

A roller body receives a tape at a cylindrical surface. First and second flange members are located adjacent one and the other ends of the roller body for movement in the axial direction of the roller body, respectively. If one edge of the tape creases, the movement of the first flange member is restrained, so that a reference position can be set for the other edge of the tape in the first flange member. If the other edge of the tape creases, the movement of the second flange member is restrained, so that a reference position can be set for the one edge of the tape in the second flange member. In either case, the centerline can be prevented from shifting. Employment of the guide roller of this type in a tape drive allows a head to reliably follow a servo track on the tape.

5 Claims, 7 Drawing Sheets

GUIDE ROLLER IN TAPE DRIVE AND METHOD OF CONTROLLING THE SAME

BACKGROUND OF THE INVENTION

1. Field of the Invention

The present invention relates to a tape drive such as a magnetic recording tape drive. In particular, the present invention relates to a guide roller utilized to guide a tape.

2. Description of the Prior Art

A pair of guide rollers is often incorporated in a magnetic recording tape drive, for example. The guide roller includes a roller body supported on a support shaft. The guide roller is designed to receive a magnetic recording tape at an outer cylindrical surface. A lower flange member is located adjacent the lower end of the roller body. An upper flange member is located adjacent the upper end of the roller body. The upper flange member is allowed to move in the axial direction of the roller body. The lower and upper flange members are designed to extend farther than the roller body in the radial direction from the longitudinal axis of the roller body. The lower flange member serves to define a reference position for the lower edge of the magnetic recording tape. The upper flange member is coupled to a restraint member fixed to the upper end of the support shaft, for example. An elastic member such as a coil spring is located between the upper flange member and the restraint member, for example.

When the magnetic tape is driven in the magnetic recording tape drive, the elasticity of the coil spring forces the upper flange member to urge the magnetic recording tape against the lower flange member in the aforementioned guide roller. The magnetic recording tape is thus allowed to travel along the reference position on the lower flange member. In this case, if the lower edge of the magnetic recording tape creases, the width of the magnetic recording tape narrows. The upper flange member forces the creasing lower edge of the magnetic recording tape to align with the reference position of the lower flange member. As a result, the servo track deviates from a predetermined reference position on the magnetic recording tape. A so-called off-track occurs. A magnetic head cannot follow the servo track on the magnetic recording tape. A tracking control cannot be realized.

SUMMARY OF THE INVENTION

It is accordingly an object of the present invention to provide a guide roller and a method of controlling the same, capable of preventing the occurrence of the off-track than so far. It is an object of the present invention to provide a tape drive capable of preventing the occurrence of the off-track than so far.

According to a first aspect of the present invention, there is provided a guide roller comprising: a roller body designed to receive a tape at a cylindrical surface; a first flange member located adjacent one end of the roller body for movement in the axial direction of the roller body, the first flange member extending farther than the roller body in the centrifugal direction of the roller body; a second flange member located adjacent the other end of the roller body for movement in the axial direction, the second flange member extending farther than the roller body in the radial direction; and a switching mechanism designed to switch over from a first state restraining the movement of the first flange member to a second state restraining the movement of the second flange member.

The guide roller enables restraint of movement of the first or second flange member. For example, if one edge of the tape creases or undulates, the first state is established in the guide roller. The movement of the first flange member is restrained in this firs state, so that a reference position can be set for the other edge of the tape in the first flange member. Distance is kept constant between the other edge of the tape and the centerline of the tape. The centerline of the tape can be prevented from shifting. If the other edge of the tape creases or undulates, the first state is switched over to the second state in the guide roller. The movement of the second flange member is in this case restrained, so that a reference position can be set for the one edge of the tape in the second flange member. Distance is kept constant between the one edge of the tape and the centerline of the tape. The centerline can be prevented from shifting. The guide roller is capable of switching over the reference position between the first and second flange members based on the restraint of the movement of the first or second flange member. Employment of the guide roller of this type in a tape drive allows a head to reliably follow a servo track on the tape even if the tape suffers from damages at either one of the edges. Off-track can be prevented than so far. A tracking control is reliably realized.

The guide roller may comprise: a first elastic member designed to exert the elasticity to urge the first flange member to the roller body; and a second elastic member designed to exert the elasticity to urge the second flange member to the roller body.

The guide roller of this type allows the first flange member to keep contacting the one edge of the tape with the assistance of the elasticity of the first elastic member. If the movement of the second flange is restrained, distance is kept constant between the other edge of the tape and the centerline of the tape. Likewise, the second flange member is allowed to keep contacting the other edge of the tape with the assistance of the elasticity of the second elastic member. If the movement of the second flange member is restrained, distance is kept constant between the one edge of the tape and the centerline of the tape. The centerline of the tape can be prevented from shifting. The guide roller is capable of switching over the reference position between the first and second flange members based on the restraint of the movement of the first or second flange member. Employment of the guide roller of this type in a tape drive allows a head to reliably follow a servo track on the tape even if the tape suffers from damages at either one of the edges. Off-track can be prevented than so far. A tracking control is reliably realized. The guide roller may be incorporated in a tape drive such as a magnetic recording tape drive, for example.

According to a second aspect of the present invention, there is provided a guide roller comprising: a roller body designed to receive a tape at a cylindrical surface; a flange member located adjacent one end of the roller body for movement in the axial direction of the roller body, the flange member extending farther than the roller body in the radial direction of the roller body; an elastic member designed to exert the elasticity to urge the flange member toward the roller body; and a restraint mechanism designed to restrict the movement of the flange member.

The guide roller of this type allows the flange member to keep contacting one edge of the tape with the assistance of the elasticity of the elastic member even if the one edge of the tape creases or undulates. If the other edge of the tape is aligned with a reference position, distance is kept constant between the other edge of the tape and the centerline of the tape. The centerline of the tape can be prevented from shifting. A relative position can be kept constant between the tape and a member somehow acting on the tape. If the movement of the flange member is restrained, a reference position can be set for the other edge of the tape in the flange member. Distance is kept constant between the other edge of the tape and the centerline of the tape. The centerline can be prevented from shifting. The relative position can be kept constant between the tape and the member acting on the tape. The guide roller is in this manner capable of switching over the alignment of the reference position between the edges of the tape based on the restraint of the movement of the flange member. Employment of the guide roller of this type in a tape drive allows a head to reliably follow a servo track on the tape even if the tape suffers from damages at either one of the edges. Off-track can be prevented than so far. A tracking control is reliably realized. The guide roller may be incorporated in a tape drive such as a magnetic recording tape drive, for example.

According to a third aspect of the present invention, there is provided a method of controlling a guide roller, comprising: restraining the movement of a first flange contacting one edge of a tape near one end of a roller body contacting the tape; and restraining the movement of a second flange contacting the other edge of the tape near the other end of the roller body when a servo track is lost on the tape.

A reference position can be set in the first flange for the one edge of the tape when the movement of the first flange is restrained. Distance is kept constant between the one edge of the tape and the centerline of the tape. The centerline can be prevented from shifting. A relative position can be kept between the tape and a member acting on the tape. When the servo track on the tape is lost because of crease or undulation of one edge of the tape, the movement of the second flange is restrained. As a result, a reference position can be set in the second flange for the other edge of the tape. Distance is kept constant between the other edge of the tape and the centerline of the tape. The centerline of the tape can be prevented from shifting. A relative position can be kept constant between the tape and the member acting on the tape. The restraint of the movement serves to realize the switchover of the reference position for the edge of the tape between the first and second flanges. Employment of the method of this type in a tape drive allows a head to reliably follow a servo track on the tape even if the tape suffers from damage at either one of the edges. Off-track can be prevented than so far. A tracking control is reliably realized.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
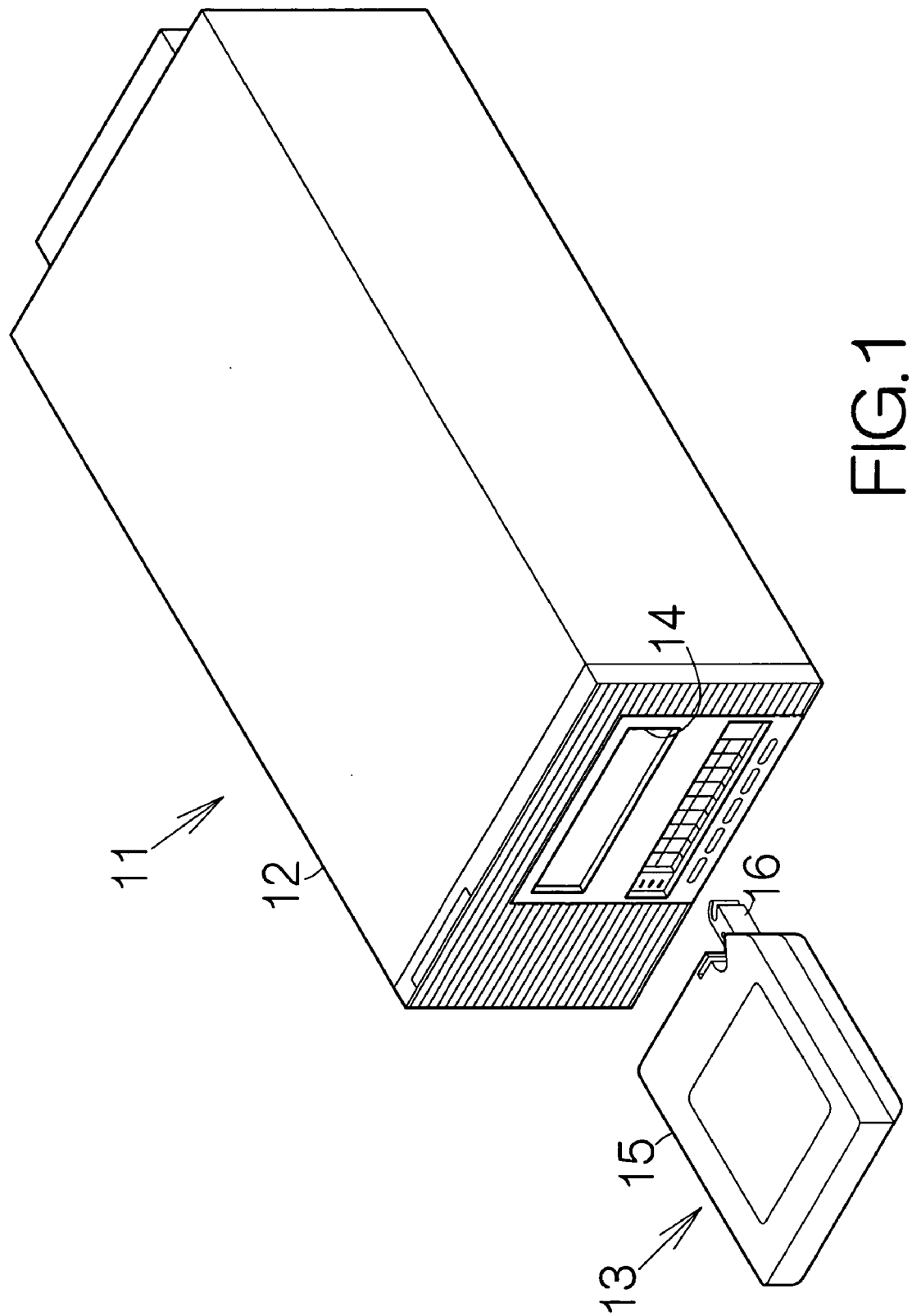
FIG. 1 is a perspective view schematically illustrating a magnetic recording tape drive as an example of a tape drive according to an embodiment of the present invention.

FIG. 1 schematically illustrates the externals of a magnetic recording tape drive 11 as an example of a recording tape drive or storage device according to an embodiment of the present invention. The magnetic recording tape drive 11 includes a box-shaped main enclosure 12 defining an inner space. A receiving aperture 14 is defined in the front panel of the main enclosure 12 so as to receive a magnetic recording tape cartridge 13. The magnetic recording tape drive 11 may be connected to a server computer, not shown, such as a backup server, for example.

The magnetic recording tape cartridge 13 includes a box-shaped casing 15 defining an inner space. A magnetic recording tape is incorporated in the inner space of the casing 15. The magnetic recording tape is wound around a reel incorporated in the inner space of the casing 15. The front end of the magnetic recording tape is located at an opening, not shown, formed in the casing 15. A leader block 16 is attached to the front end of the magnetic recording tape. The leader block 16 is located at a position outside the opening of the casing 15. Here, the tape width of the magnetic recording tape may be set at half an inch, for example.

Figure 2:
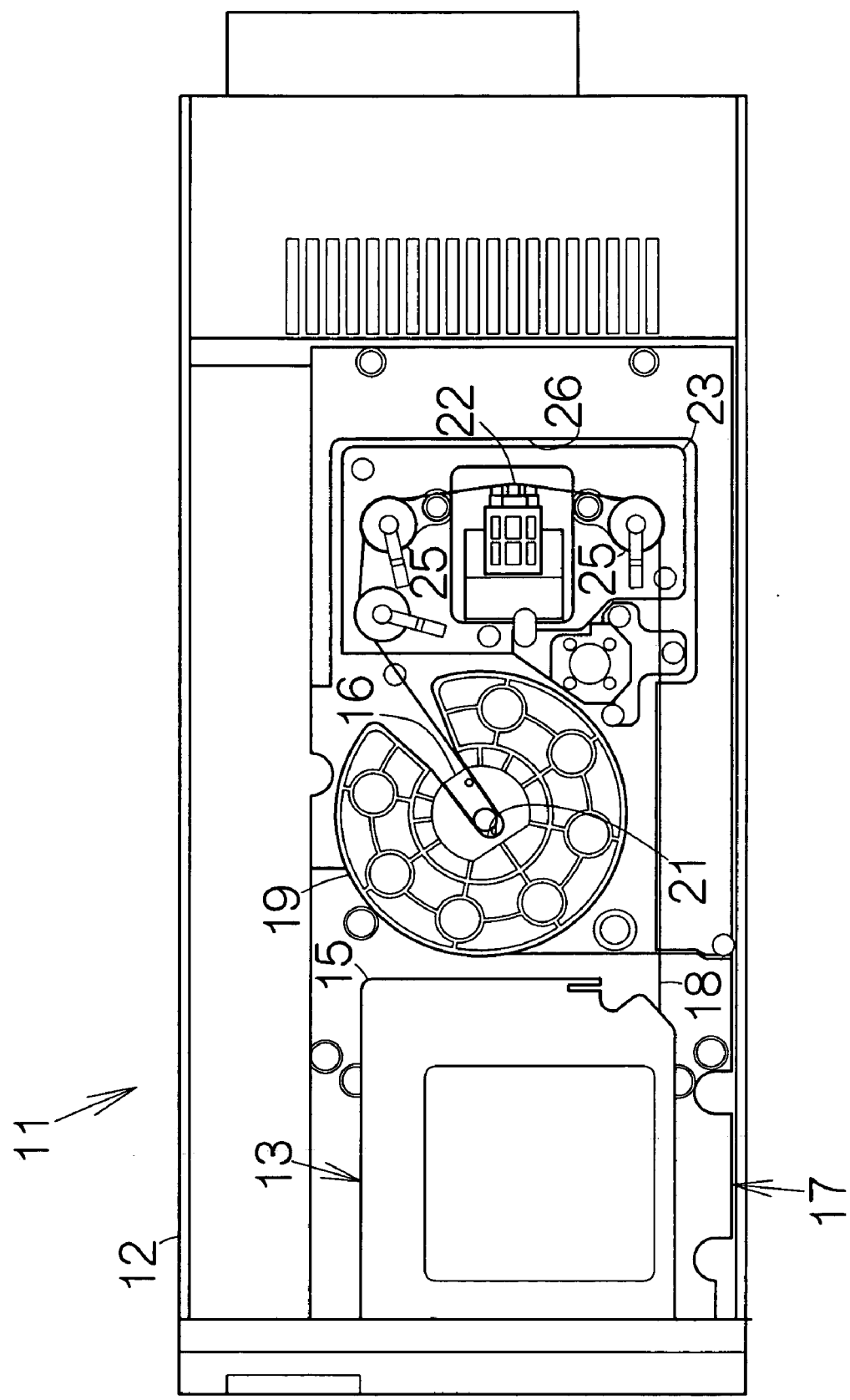
FIG. 2 is an exploded plan view of the magnetic recording tape drive for schematically illustrating the inner structure of the magnetic recording tape drive.

As shown in FIG. 2, a tape loader 17 is incorporated in the inner space of the magnetic recording tape drive 11. The tape loader 17 is designed to receive the magnetic recording tape cartridge 13 inserted through the receiving aperture 14. The tape loader 17 also serves to eject the magnetic recording tape cartridge 13 out of the magnetic recording tape drive 11 through the receiving aperture 14. The tape loader 17 includes an electric motor, not shown, designed to drive the reel of the magnetic recording tape cartridge 13 for rotation. The motor drives the reel in the magnetic recording tape cartridge 13 so that the magnetic recording tape 18, once drawn out from the casing 15, is wound back around the reel.

A reel 19 is incorporated in the inner space of the magnetic recording tape drive 11. The magnetic recording tape 18 can be wound around the reel 19. A motor, not shown, is coupled to the reel 19 so as to drive the reel 19 for rotation. A receiving recess 21 is formed in the reel 19 so as to receive the leader block 16 of the front end of the magnetic recording tape 18. When the leader block 16 is received in the receiving recess 21, the leader block 16 is connected to the reel 19. When the reel 19 rotates, the magnetic recording tape 18 is wound around the reel 19.

A magnetic head 22 is incorporated in the inner space of the magnetic recording tape drive 11. The magnetic head 22 is fixed to a base 23, for example. The base 23 is received on the bottom plate of the main enclosure 12. The magnetic head 22 is designed to stand upright in a vertical direction from the upper surface of the base 23. At least a pair of guide rollers 25 is mounted on the base 23. Each guide roller 25 is likewise designed to stand upright in the vertical direction from the upper surface of the base 23. The magnetic head 22 is located between the guide rollers 25. The magnetic head 22 and the guide rollers 25 will be described later in detail.

A guide rail 26 is defined around the base 23. The guide rail 26 is designed to extend from the tape loader 17 to the reel 19 via the magnetic head 22 and the guide rollers 25. The guide rail 26 serves to guide a threader, not shown, conveying the leader block 16. The movement of the threader allows the leader block 16 to move from the tape loader 17 to the reel 19. At the same time, the magnetic recording tape 18 is received around the guide rollers 25 and the magnetic head 22 based on the movement of the leader block 16.

A motherboard, not shown, is incorporated in the main enclosure 12. As conventionally known, electronic circuit elements, such as a digital signal processor (DSP) and a memory, are mounted on the motherboard, for example. A random access memory (RAM) may be employed as the memory, for example. The digital signal processor is designed to execute various processings based on software programs and data temporarily stored in the random access memory, for example. The software programs and data may be stored in a nonvolatile memory likewise mounted on the motherboard. The digital signal processor is allowed to utilize the random access memory as a working area to execute the software programs.

Figure 3:
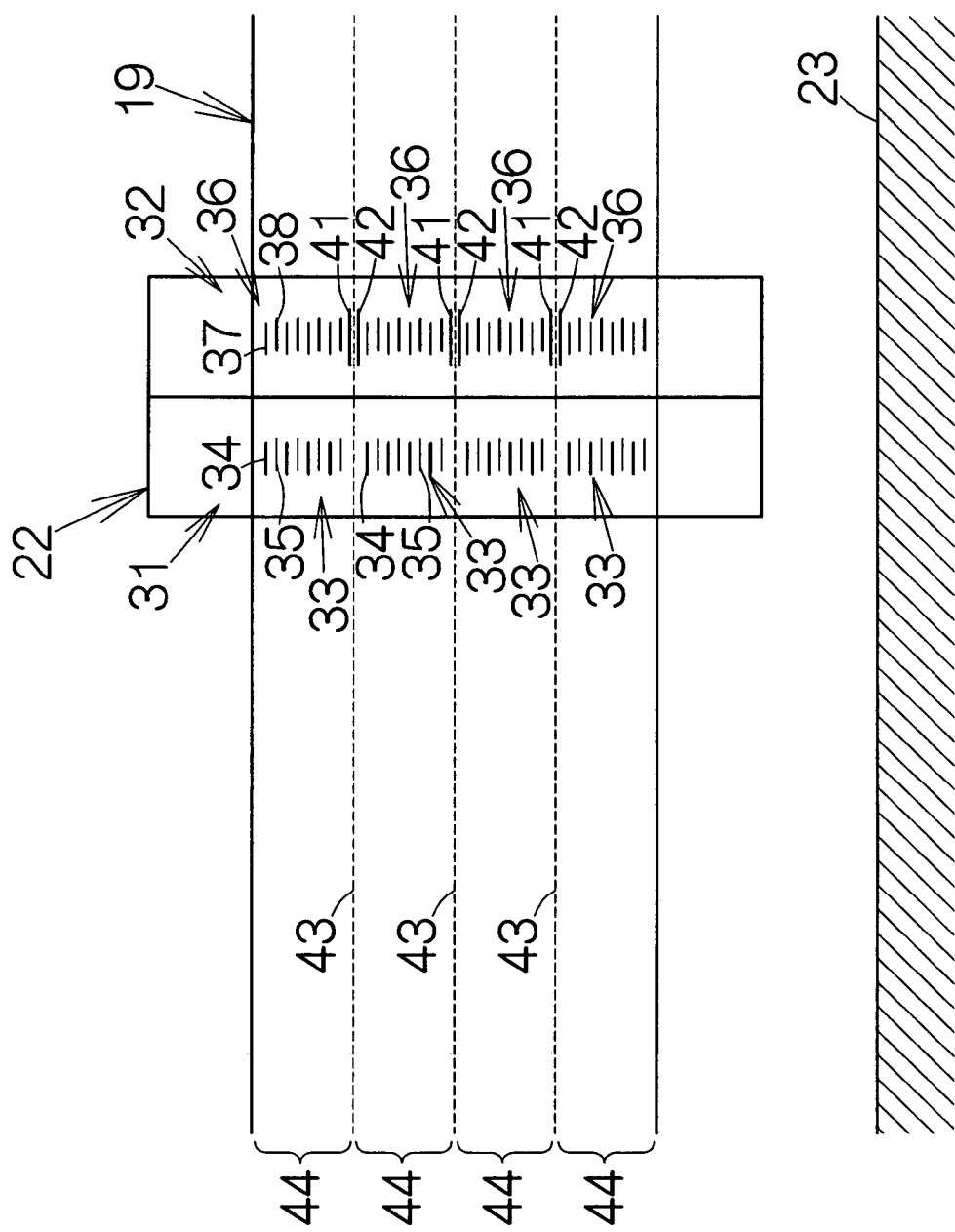
FIG. 3 is an enlarged partial front view for schematically illustrating the structure of a magnetic head with respect to a magnetic recording tape.

As shown in FIG. 3, the magnetic head 22 includes a first head set 31 and a second head set 32 adjacent the first head set 31. Heads are arranged in a row in a vertical direction relative to the base 23, in each of the first and second head sets 31, 32, respectively. The first head set 31 includes four head groups 33 equally spaced in the vertical direction relatively to the base 23. Each individual head group 33 includes four write elements 34 and four read elements 35 alternately located at equal intervals. Likewise, the second head set 32 includes four head groups 36 equally spaced in the vertical direction relatively to the base 23. Each individual head group 36 includes four read elements 37 and four write elements 38 alternately located at equal intervals. The write elements 34 of the first head set 31 are aligned with the read elements 37 of the second head set 32 on horizontal lines. Likewise, the read elements 35 of the first head set 31 are aligned with the write elements 38 of the second head set 32 on horizontal lines. The read elements 37 of the second head set 32 are designed to follow data tracks which the write elements 34 of the first head set 31 establish. Likewise, the read elements 35 of the first head set 31 are designed to follow data tracks which the write elements 38 of the second head set 32 establish.

First and second servo head elements 41, 42 are located between the adjacent head groups 36 in the second head set 32. The first and second servo head elements 41, 42 are spaced by a predetermined distance in the vertical direction relatively to the base 23. On the other hand, three parallel servo tracks 43 are defined on the magnetic recording tape 18. The servo tracks 43 serve to define four data regions 44 on the magnetic recording tape 18. When the magnetic tape 18 moves, one of the first and second servo head elements 41, 42 follows the servo track 43 on the magnetic recording tape 18. A servo signal is read out from the servo track 43. The servo signal is transferred to the digital signal processor on the motherboard. The digital signal processor calculates amounts of shift of the magnetic head 22. The magnetic head 22 is moved in the vertical direction based on the calculated amount of shift. The tracking control of the magnetic head 22 is realized in this manner. The first servo head element 41 is allowed to follow two routes parallel in the vertical direction with respect to the servo track 43. Likewise, the second servo head element 42 is allowed to follow two routes parallel in the vertical direction with respect to the servo track 43. Therefore, each individual write element 34, 38 is allowed to establish four parallel data tracks on the magnetic recording tape 18 in response to switchover of the routes and the first and second servo head elements 41, 42. Likewise, the individual read elements 37, 35 are allowed to read four parallel data tracks on the magnetic recording tape 18 in response to switchover of the routes and the first and second servo head elements 41, 42. Thirty-two data tracks can thus be established over each individual data region 44.

Figure 4:
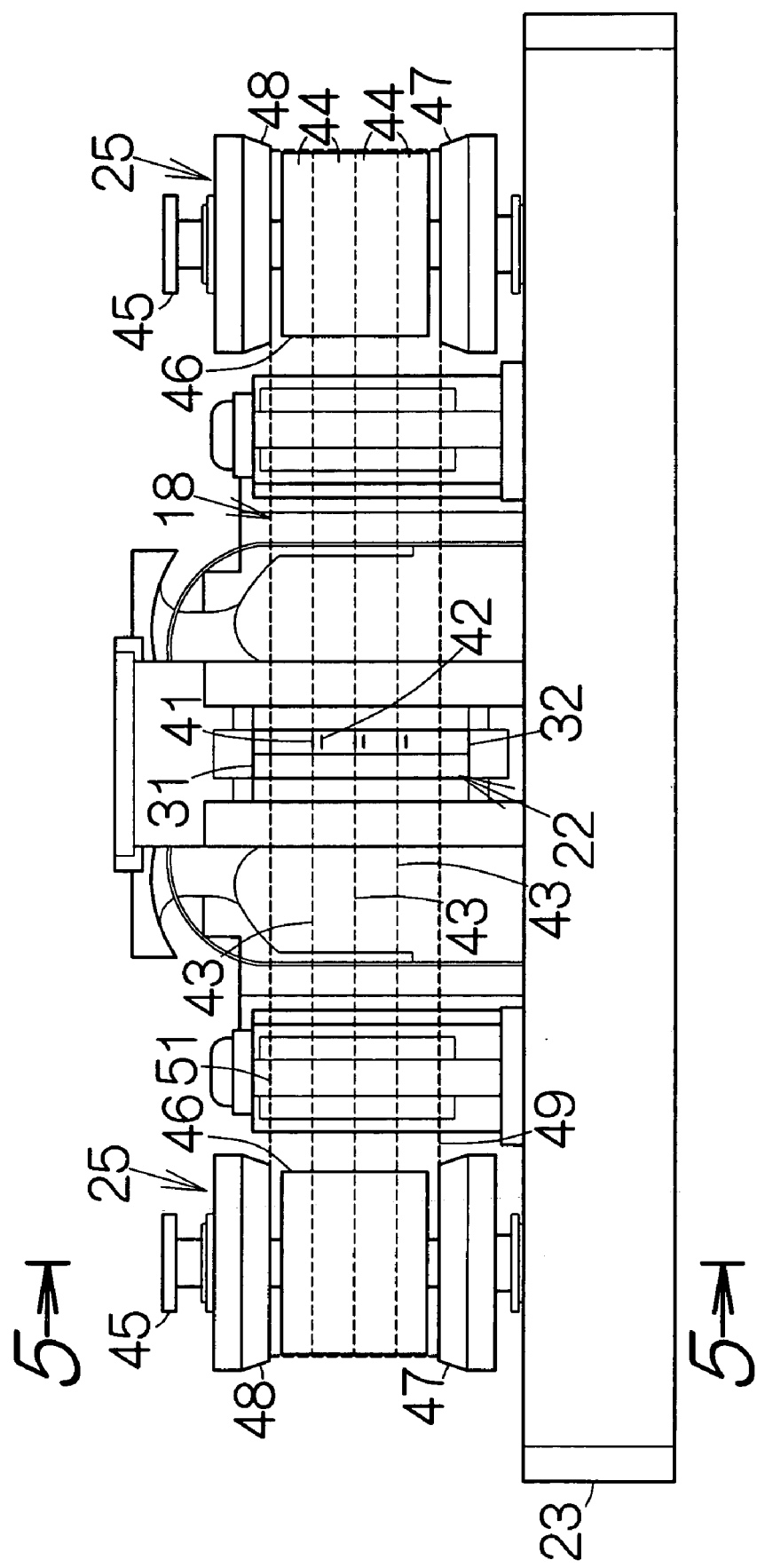
FIG. 4 is a front view for schematically illustrating the positional relationship between the magnetic head and the magnetic recording tape.

As shown in FIG. 4, the guide roller 25 includes a support shaft 45 standing upright in the vertical direction from the base 23, and a cylindrical roller body 46 supported coaxially on the support shaft 45 for relative rotation about the shaft 45. A first flange member 47 is located near the lower end of the roller body 46. The first flange member 47 is designed to extend farther than the roller body 46 in the radial direction from the longitudinal axis of the roller body 46. Likewise, a second flange member 48 is located near the upper end of the roller body 46. The second flange member 48 is designed to extend farther than the roller body 46 in the radial direction from the longitudinal axis of the roller body 46. As is apparent from FIG. 4, when the magnetic recording tape 18 is wound around the guide roller 25, the magnetic recording tape 18 is received at the cylindrical surface of the roller body 46. The first flange member 47 contacts the lower edge 49 of the magnetic recording tape 18. The second flange member 48 contacts the upper edge 51 of the magnetic recording tape 18. The first and second flange members 47, 48 serve to position the magnetic recording tape 18 in the vertical direction, so that the first and second servo head elements 41, 42 on the magnetic head 22 are allowed to follow the servo tracks 43 on the magnetic recording tape 18. A so-called on-track can thus be realized. The first and second flange members 47, 48 may be formed in a truncated cone tapered toward the roller body 46.

Figure 5:
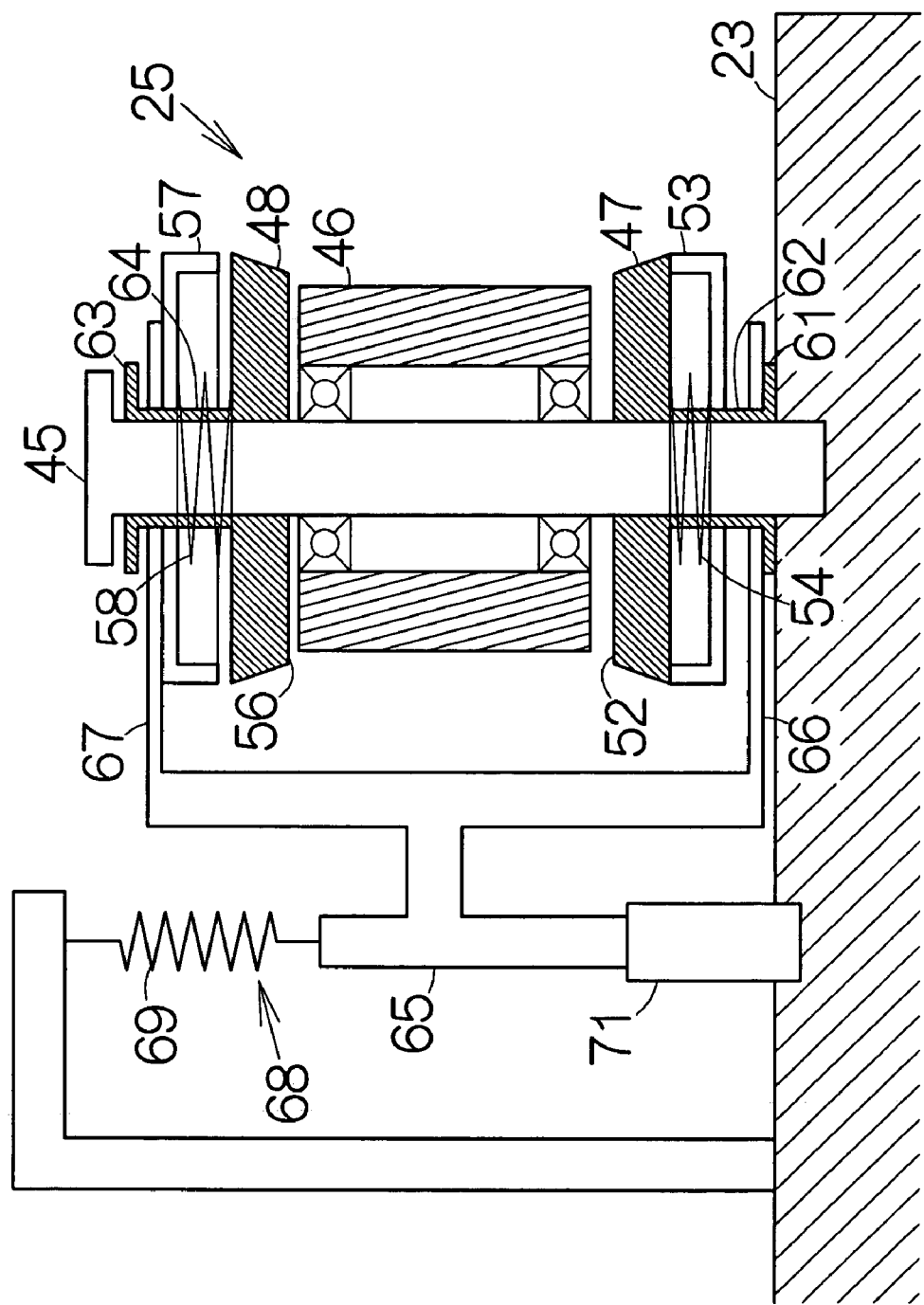
FIG. 5 is a sectional view of a guide roller, taken along the line 5-5 in FIG. 4.

Referring to FIG. 5, the first flange member 47 is mounted coaxially on the support shaft 45 for movement in the axial direction of the support shaft 45, namely in the vertical direction. The first flange member 47 is designed to receive the lower edge 49 of the magnetic recording tape 18 at an upper horizontal flat surface 52 (FIG. 5). A first restraint member 53 is opposed to a downward surface of the first flange member 47. The first restraint member 53 may be stationary to the support shaft 45 or the base 23, for example. The first restraint member 53 is designed to restrain downward vertical movement of the first flange member 47. In other words, the first restraint member 53 defines the lowermost position of the first flange member 47. The first flange member 47 is allowed to move upward from the lowermost position. When the lower edge 49 of the magnetic recording tape 18 is received on the first flange member 47 at the lowermost position, the first servo head element 41 or the second servo head element 42 of the magnetic head 22 can be positioned on the servo track 43 on the magnetic recording tape 18.

A first elastic member or coil spring 54 is located between the first restraint member 53 and the first flange member 47. The first coil spring 54 serves to exert elasticity to urge the first flange member 47 resiliently toward the roller body 46. When the magnetic recording tape 18 is wound around the roller body 46, the first flange member 47 is allowed to drive the magnetic recording tape 18 toward the second flange member 48.

The second flange member 48 is mounted coaxially on the support shaft 45 in the same manner as the first flange member 47 for movement in the axial direction of the support shaft 45. The second flange member 48 is designed to receive the upper edge 51 of the magnetic recording tape 18 at a downward horizontal flat surface 56. A second restraint member 57 is opposed to an upper surface of the second flange member 48. The second restraint member 57 may be stationary relatively to the axis of the support shaft 45 or the base 23, for example. The second restraint member 57 is designed to restrain upward movement of the second flange member 48. The second restraint member 57 defines the uppermost position of the second flange member 48. The second flange member 48 is allowed to move downward from the uppermost position. When the upper edge 51 of the magnetic recording tape 18 is received on the second flange member 48 at the uppermost position, the first servo head element 41 or the second servo head element 42 of the magnetic head 22 can be positioned on the servo track 43 on the magnetic recording tape 18.

A second elastic member or second coil spring 58 is located between the second restraint member 57 and the second flange member 48. The second coil spring 58 serves to exert elasticity to urge the second flange member 48 resiliently toward the roller body 46. When the magnetic recording tape 18 is wound around the roller body 46, the second flange member 48 is allowed to drive the magnetic recording tape 18 toward the first flange member 47.

A small flange 61 is integrally formed on the first flange member 47. The small flange 61 is opposed to a downward surface of the first restraint member 53. The small flange 61 extends outwardly from the tip or lower end of a cylindrical body 62 extending downwardly from the downward surface of the first flange member 47. When the first flange member 47 at the lowermost position contacts the first restraint member 53, the distance between the small flange 61 and the first restraint member 53 is set larger than the distance of movement of the first flange member 47 in the vertical direction.

A small flange 63 is integrally formed on the second flange member 48. The small flange 63 is opposed to an upward surface of the second restraint member 57. The small flange 63 may extend outward from the tip or upper end of a cylindrical body 64 extending upward from the upward surface of the second flange member 48. When the second flange member 48 at the uppermost position contacts the second restraint member 57, the distance between the small flange 63 and the second restraint member 57 is set larger than the distance of movement of the second flange member 48 in the vertical direction.

An arm member 65 is related to the small flanges 61, 63 of the first and second flange members 47, 48. The arm member 65 is mounted on the base 23 for movement in the vertical direction, for example. The arm member 65 includes first and second arms 66, 67. The first arm 66 is located between the small flange 61 of the first flange member 47 and the restraint member 53. The second arm 67 is located between the small flange 63 of the second flange member 48 and the restraint member 57. The first arm 66 engages the small flange 61 of the first flange member 47. When the first arm 66 moves downward, the first flange member 47 is drive downward against the elasticity of the first coil spring 54. Since the first flange member 47 contacts the first restraint member 53 in this case, the movement of the first flange member 47 is restrained at the lowermost position. The first arm 66 or the arm member 65 serves as a restraint mechanism according to the present invention. On the other hand, the second arm 67 is engaged with the small flange 63 of the second flange member 48. When the second arm 67 moves upward, the second flange member 48 is driven upward against the elasticity of the second coil spring 58. Since the second flange member 48 contacts the second restraint member 57 in this case, the movement of the second flange member 48 is restrained at the uppermost position. The second arm 67 or the arm member 65 serves as a restraint mechanism according to the present invention.

A switching mechanism 68 is connected to the arm member 65. The switching mechanism 68 includes an elastic member or coil spring 69. The coil spring 69 serves to exert the elasticity to urge the arm member 65 toward the base 23. When the arm member 65 thus moves downward, the first arm 66 is allowed to hold the first flange member 47 at the lowermost position. On the other hand, the second arm 67 is kept away from the small flange 63 of the second flange member 67. The second flange member 48 is thus allowed to move in the vertical direction. A first state is in this manner established in the guide roller 25.

The switching mechanism 68 also includes an electromagnetic solenoid 71. The electromagnetic solenoid 71 serves to keep the arm member 65 away from the surface of the base 23 in response to supply of electric power. When the arm member 65 thus moves upward, the second arm 67 is allowed to hold the second flange member 48 at the uppermost position. The first arm 66 is thus kept away from the small flange 61 of the first flange member 47. The first flange member 47 is allowed to move in the vertical direction. A second state is in this manner established in the guide roller 25. When the supply of the electric power is terminated to the electromagnetic solenoid 71, the elasticity of the coil spring 69 serves to move the arm member 65 downward toward the surface of the base 23. In this manner, the guide roller 25 returns to the first state.

Now, assume that the data signal is read out from the magnetic recording tape 18. When the magnetic recording tape cartridge 13 is inserted through the receiving aperture 14, the magnetic recording tape cartridge 13 is mounted on the tape loader 17. The leader block 16 is guided to the receiving recess 21 along the guide rail 26. The magnetic recording tape 18 is thus received around the guide rollers 25 and the magnetic head 22. The first state is established in the individual guide rollers 25. All the performance may be realized based on the operations of the digital signal processor.

The digital signal processor instructs the reel 19 to rotate so that the magnetic recording tape 18 is wound around the reel 19. When the reel 19 starts rotating, the magnetic recording tape 18 moves in a normal direction from the magnetic recording tape cartridge 13 to the reel 19. The guide rollers 25 serve to position the first servo head elements 41 at the corresponding servo tracks 43. The first servo head elements 41 follow the servo tracks 43. The tracking control of the magnetic head 22 is executed based on the servo signals read out from the servo tracks 43. The read elements 37 of the second head set 32 are thus positioned right on the data tracks. The data signals are read out from the data tracks.

When the magnetic recording tape 18 has completely been wound around the reel 19, the digital signal processor next instructs the tape loader 17 to drive the reel in the magnetic recording tape cartridge 13 so that the magnetic recording tape 18 returns to the magnetic recording tape cartridge 13. The magnetic recording tape 18 travels in the reverse direction from the reel 19 toward the magnetic recording tape cartridge 13. The guide rollers 25 allow the individual first servo head elements 41 to keep following the corresponding servo tracks 43. The read elements 35 of the first head set 31 are accurately positioned on the data tracks. The data signals are read out from data tracks adjacent the aforementioned data tracks.

When the magnetic recording tape 18 has completely been wound around the reel within the magnetic recording tape cartridge 13, the digital signal processor instructs the magnetic head 22 to move. The magnetic head 22 is thus shifted. The digital signal processor then instructs the reel 19 to rotate again so that the magnetic recording tape 18 is wound around the reel 19. The magnetic recording tape 18 travels again in the normal direction from the magnetic recording tape cartridge 13 toward the reel 19. The first servo head elements 41 keep following the servo tracks 43 at the shifted position. The tracking control of the magnetic head 22 is performed based on the servo signals read out from the servo tracks 43. The read elements 37 of the second head set 32 are thus accurately positioned on the data tracks adjacent the aforementioned data tracks. The data signals are read out from the data tracks.

If a trouble is detected in reading out the servo signals, the digital signal processor operates to rewind the magnetic recording tape 18 in a predetermined length around the reel 19 or the tape loader 17. The magnetic recording tape 18 then restarts to run. If the servo signals are accurately read out, the magnetic recording tape 18 is allowed to keep running. If the servo signals are erroneously read out even after the several rewind of the magnetic recording tape 18, the digital signal processor determines an error.

Figure 6:
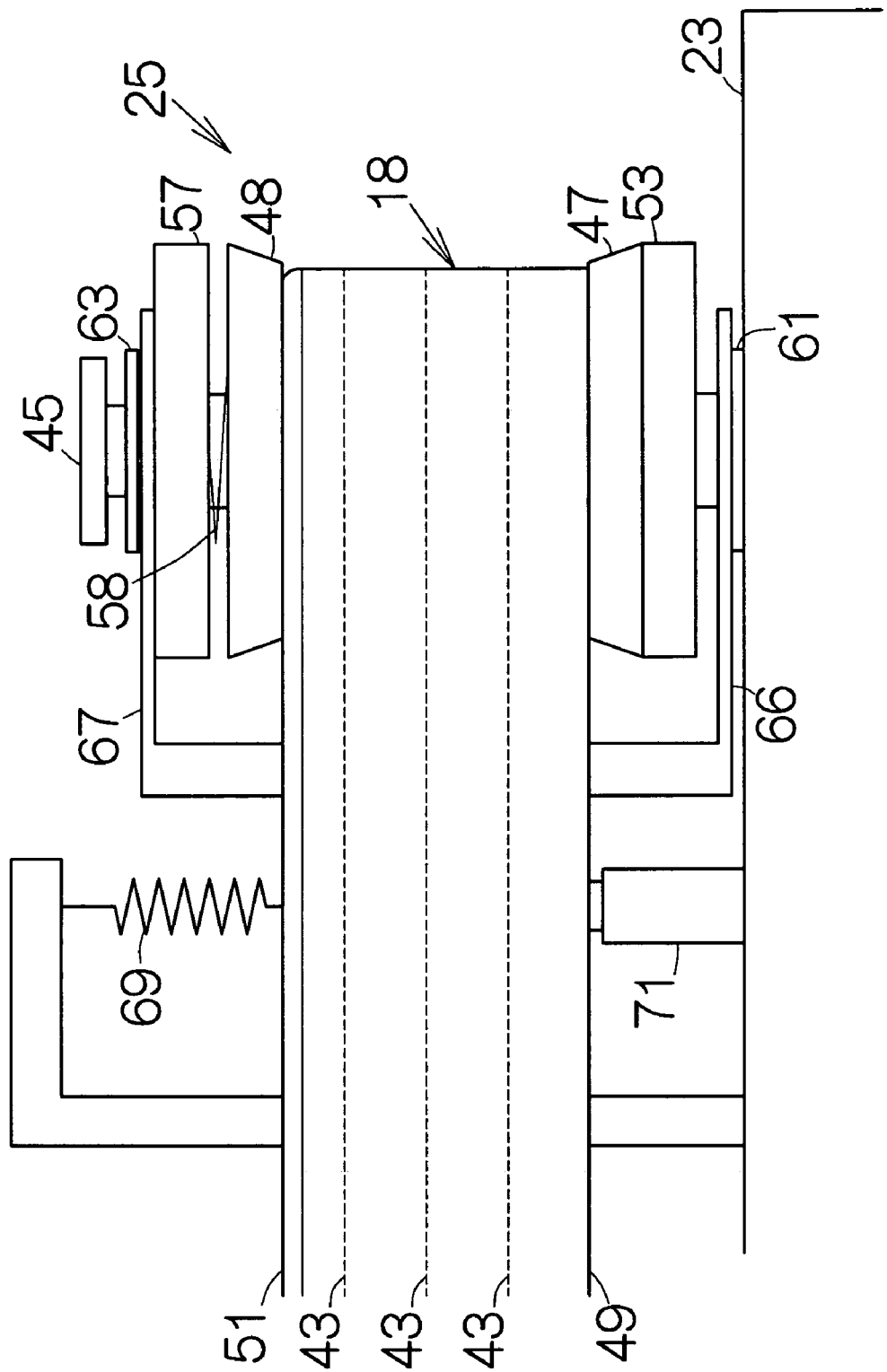
FIG. 6 is a side view of the guide roller for schematically illustrating the magnetic recording tape received around the guide roller when the upper edge of the magnetic recording tape creases.

Next, assume that the upper edge 51 of the magnetic recording tape 18 creases or undulates. As shown in FIG. 6, for example, the elasticity (i.e., resiliency) of the coil spring 58 allows the second flange member 48 to keep contacting the upper edge 51 of the magnetic recording tape 18. The distance is kept constant between the lower edge 49 of the magnetic recording tape 18 and the servo tracks 43. Since the first flange member 47 is held at the lowermost position, the servo tracks 43 are prevented from shifting. The relative position can be kept constant between the magnetic recording tape 18 and the magnetic head 22. The tracking control is reliably established. The data signals are read out from the data tracks.

Next, assume that the lower edge 49 of the magnetic recording tape 18 creases or undulates. The distance narrows between the lower edge 49 and the servo tracks 43 in the magnetic recording tape 18 based on the crease or undulation at the lower edge 49. If the magnetic recording tape 18 is urged against the first flange member 47 in this situation, the magnetic recording tape 18 shifts toward the first flange member 47. As a result, the first servo head elements 41 tend to deviate from the servo tracks 43. The first servo head elements 41 cannot keep reading out the servo signals. The off-track condition then occurs. As described above, the rewind of the magnetic recording tape 18 and the read out of the servo signals are repeated in accordance with the instructions from the digital signal processor. The first servo head elements 41 cannot read out the servo signals even after the several rewinds of the magnetic recording tape 18. The digital signal processor thus operates to switch over from the first state to the second state in the guide rollers 25.

Figure 7:
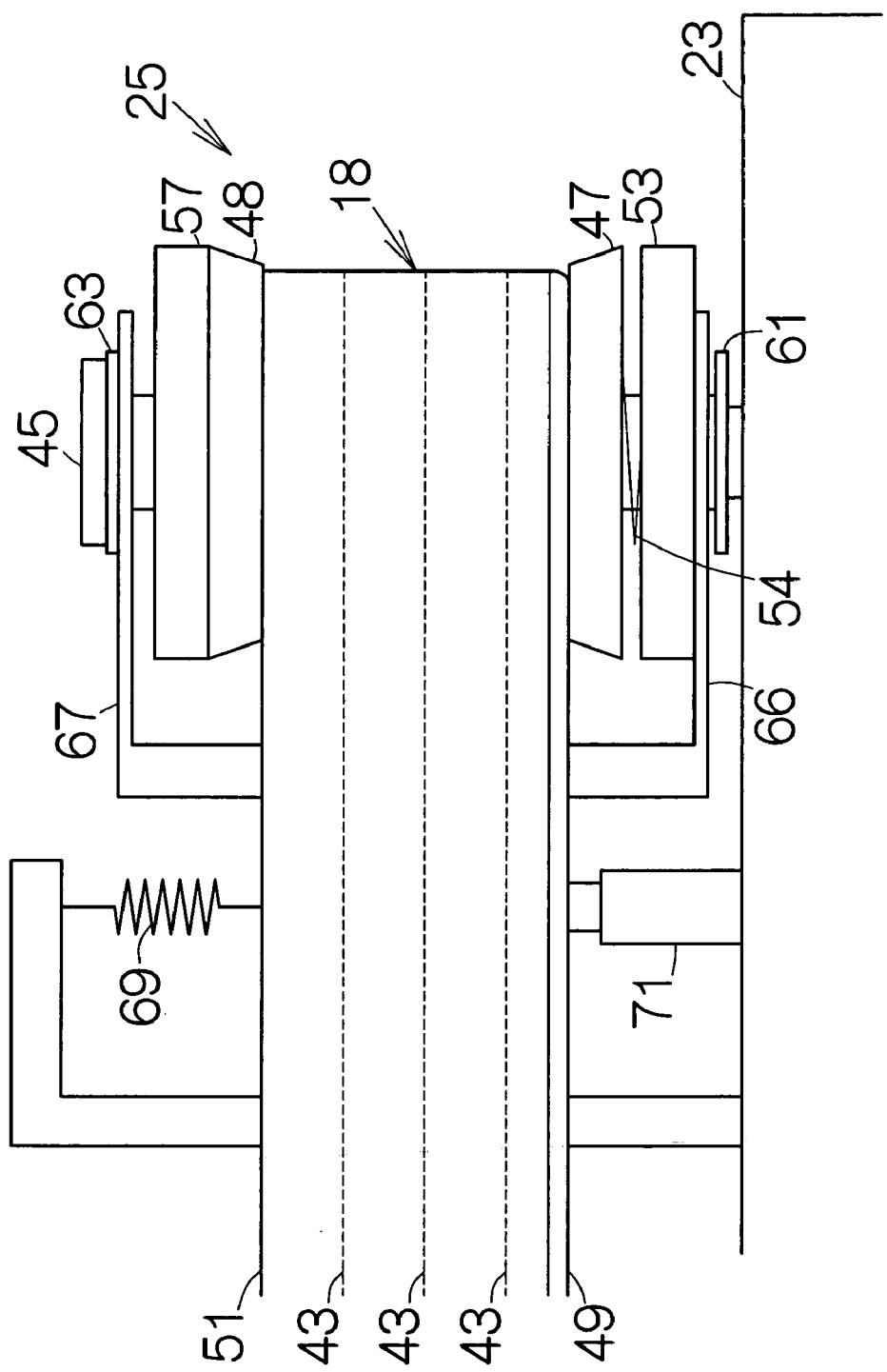
FIG. 7 is a side view of the guide roller for schematically illustrating the magnetic recording tape received around the guide roller when the lower edge of the magnetic recording tape creases.

Electric power is supplied to the electromagnetic solenoid 71 in accordance with the instructions from the digital signal processor in order to switch over from the first state to the second state. As shown in FIG. 7, for example, the elasticity of the coil spring 54 allows the first flange member 47 to keep contacting the lower edge 49 of the magnetic recording tape 18. The distance is kept constant between the upper edge 51 and the servo tracks 43. Since the second flange member 48 is held at the uppermost position, the servo tracks 43 are prevented from shifting. The relative position can thus be kept constant between the magnetic recording tape 18 and the magnetic head 22. The tracking control is reliably realized. The data signals are read out form the data tracks.

The magnetic recording tape drive 11 enables establishment of the first state in the guide rollers 25 if the upper edge 51 of the magnetic recording tape 18 creases or undulates. Since the movement of the first flange member 47 is restrained in the first state, the reference position of the lower edge 49 is set in the first flange member 47. The magnetic head 22 is allowed to reliably follow the servo tracks 43. The magnetic recording tape drive 11 also enables establishment of the second state in the guide rollers 25 if the lower edge 49 of the magnetic recording tape 18 creases or undulates. Since the movement of the second flange member 48 is restrained, the reference position of the upper edge 51 is set in the second flange member 48. The magnetic head 22 is allowed to reliably follow the servo tracks 43. The guide rollers 25 thus allow switchover of the reference positions based on the restraint of the movement of the first and second flange members 47, 48. The occurrence of the off-track can be prevented than so far. The tracking control can reliably be realized.

What is claimed is:

1. A guide roller, comprising:
    a roller body designed to receive a tape at a cylindrical surface;
    a first flange member located adjacent to a first end of the roller body for movement in an axial direction of the roller body, said first flange member extending farther than the roller body in a radial direction relative to a axial direction of the roller body;
    a second flange member located adjacent to a second, opposite end of the roller body for movement in the axial direction of the roller body, said second flange member extending farther than the roller body in the radial direction; and
    a switching mechanism switching a first state, restraining axial movement of the first flange member, to a second state, restraining axial movement of the second flange member.

2. The guide roller according to claim 1, further comprising:
    a first elastic member designed resiliently urging said first flange member toward said roller body; and
    a second elastic member resiliently urging said second flange member toward said roller body.

3. A guide roller, comprising:
    a roller body designed to receive a tape at a cylindrical surface;
    a flange member located adjacent to one end of the roller body for movement in an axial direction of the roller body, said flange member extending farther than the roller body in a radial direction relative an axis of the roller body;
    an elastic member designed resiliently urging the flange member toward the roller body;
    a restraint mechanism designed to restrain axial movement of the flange member; and
    a switching mechanism switching the restraint mechanism from a first stae, restraining the axial movement of the flange member, to a second state, allowing the axial movement of the flange member.

4. A tape drive comprising:

a roller body designed to receive a tape at a cylindrical surface;

a first flange member located adjacent to one end of the roller body for movement in an axial direction of the roller body, said first flange member extending farther than the roller body in a radial direction relative to an axis of the roller body;

a second flange member located adjacent to other end of the roller body for movement in the axial direction of the roller body, said second flange member extending farther than the roller body in the radial direction; and a switching mechanism switching a first state, restraining axial movement of the first flange member, to a second state, restraining axial movement of the second flange member.

5. A tape drive, comprising:

a roller body designed to receive a tape at a cylindrical surface;

a flange member located adjacent to an end of the roller body for movement in an axial direction of the roller body, said flange member extending farther than the roller body in a radial direction relative to the axial direction of the roller body;

an elastic member designed the flange member toward the roller body;

a restraint mechanism designed to restrain movement of the flange member; and a switching mechanism switching the restraint mechanism from a first state, restraining the axial movement of the flange member, to a second state, allowing the axial movement of the flange member.

* * * * *

UNITED STATES PATENT AND TRADEMARK OFFICE
CERTIFICATE OF CORRECTION

PATENT NO. : 7,278,605 B2
APPLICATION NO. : 10/999075
DATED : October 9, 2007
INVENTOR(S) : Minoru Hikita It is certified that error appears in the above-identified patent and that said Letters Patent is hereby corrected as shown below:

Column 10, Line 34, after "to" change "a" to --the--.

Column 10, Line 47, after "member" delete "designed".

Column 10, Line 58, after "relative" insert --to--.

Column 10, Line 60, after "member" delete "designed".

Column 10, Line 64-65, change "mechnaism" to --mechanism--.

Column 10, Line 65, change "stae," to --state,--.

Column 11, Line 1, after "drive" insert --,--.

Column 12, Line 9, after "member" delete "designed".

Column 12, Line 9, before "the flange" insert --resiliently urging--.

Column 12, Line 11, after "restrain" insert --axial--.

Signed and Sealed this

Twenty-ninth Day of April, 2008

JON W. DUDAS
*Director of the United States Patent and Trademark Office*